US008351555B2

(12) United States Patent
Semenov et al.

(10) Patent No.: US 8,351,555 B2
(45) Date of Patent: Jan. 8, 2013

(54) APPARATUS AND METHOD FOR SINR ESTIMATION HSDPA MIMO RECEIVER (75) Inventors: Sergei Semenov, Salo (FI); Kjell Ostman, Halikko (FI); Andre Malkov, Muurla (FI); Jussi Vesma, Turku (FI); Risto Paatelma, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/020,168

(22) Filed: Feb. 3, 2011

(65) Prior Publication Data
US 2012/0201285 A1 Aug. 9, 2012

(51) Int. Cl.
*H04B 1/10* (2006.01)
(52) U.S. Cl. ........ 375/350; 375/285; 375/296; 375/347; 375/349
(58) Field of Classification Search .................. 375/130, 375/140, 147–149, 229–232, 259–260, 285, 375/295–296, 316, 346–350
See application file for complete search history.

(56) References Cited

U.S. PATENT DOCUMENTS

| 7,620,112 | B2 * | 11/2009 | Tang et al. | 375/260 |
| 7,627,051 | B2 * | 12/2009 | Shen et al. | 375/267 |
| 7,751,492 | B2 * | 7/2010 | Jalali et al. | 375/267 |
| 8,073,088 | B2 * | 12/2011 | Badri-Hoeher et al. | 375/350 |
| 2008/0095282 | A1 * | 4/2008 | Walton et al. | 375/347 |
| 2010/0260252 | A1 * | 10/2010 | Landau et al. | 375/232 |

* cited by examiner

*Primary Examiner* — David C. Payne
*Assistant Examiner* — James M Perez
(74) *Attorney, Agent, or Firm* — Nokia Corporation (57) ABSTRACT

In an example embodiment a method comprises receiving at least one data stream from at least two transmitter antennas, wherein the at least one data stream is pre-coded by a set of weighting coefficients; receiving a pilot channel from each of the at least two transmitter antennas; processing the received at least one data stream by an equalizer with a set of equalizer filter coefficients; calculating for each of the at least one data stream following: a signal power and an interference power from other stream, if there is any intererence, at least in part based on a set of post equalizer channel coefficients and the set of weighting coefficients; a noise power at least in part based on the received pilot channels and the set of weighting coefficients; and a signal to interference and noise ratio based on the corresponding calculated signal power, interference power and noise power.

15 Claims, 7 Drawing Sheets

APPARATUS AND METHOD FOR SINR ESTIMATION HSDPA MIMO RECEIVER

TECHNICAL FIELD

The present application relates generally to an apparatus and a method for signal to interference and noise ratio (SINR) estimation for high speed downlink packet access (HSDPA) multiple input multiple output (MIMO) receiver.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

In wireless communication, different collections of communication protocols are available to provide different types of services and capabilities. High speed packet access (HSPA) is one of such collection of wireless communication protocols that extends and improves the performance of existing UMTS (universal mobile telecommunications system) protocols and is specified by different releases of the standard by the $3^{rd}$ generation partnership project (3GPP) in the area of mobile network technology. The other non-limiting example wireless communication protocols are long term evolution (LTE), global system for mobile (GSM) and worldwide interoperability for microwave access (WiMax).

Multiple input multiple output (MIMO) transmission has been proposed and forms part of HSPA, LTE and WiMax) system standards. In single user multiple input multiple output (SU-MIMO), a MIMO receiver with multiple antennas and receiving circuitry receives the multiple streams, separates the multiple streams and determines the transmission symbols sent over each stream of the spatially multiplexed data streams.

The application of MIMO methods to wireless communication and in particular to HSPA systems such as the double-transmitter antenna array (D-TxAA) adopted by 3GPP enables a significant increase in data throughput and link range without additional bandwidth or transmit power requirements. These systems thus operate with a higher spectral efficiency (in other words, operate with a greater bits per second per Hertz of bandwidth) than conventional HSPA implementations and also have a higher link reliability or diversity (in other words reduced susceptibility to fading).

The application of MIMO methods to HSPA systems may require different method with regards to calculating or estimating the Signal to Interference and Noise Ratio (SINR), compared with the methods used in conventional HSPA. In a MIMO implementation data is typically split into at least two streams and the data symbols are pre-coded with the help of pre-coding weights whilst the pilot symbols are transmitted on a separate channel, the Common Pilot Channel (CPICH), without pre-coding. As the CPICH pilot symbols are not pre-coded, it may not be appropriate to use the conventional SINR estimation methods.

SUMMARY

Various aspects of examples of the invention are set out in the claims.

According to a first aspect of the present invention, a method may include by a processor, receiving at least one data stream from at least two transmitter antennas, wherein the at least one data stream is pre-coded by a set of weighting coefficients; receiving a pilot channel from each of the at least two transmitter antennas; processing the received at least one data stream by an equalizer with a set of equalizer filter coefficients; calculating for each of the at least one data stream a signal power and an interference power from other stream, if there is any interference from other stream, at least in part based on a set of post equalizer channel coefficients and the set of weighting coefficients; calculating for each of the at least one data stream a noise power at least in part based on the received pilot channels and the set of weighting coefficients; and calculating for each of the at least one data stream a signal to interference and noise ratio based on the corresponding calculated signal power, interference power and noise power.

According to a second aspect of the present invention, an apparatus may include at least one processor, and at least one memory including computer program code, wherein the at least one memory and the computer program code configured to, with the at least one processor, cause the apparatus to receive at least one data stream from at least two transmitter antennas, wherein the at least one data stream is pre-coded by a set of weighting coefficients; receive a pilot channel from each of the at least two transmitter antennas; process the received at least one data stream by an equalizer with a set of equalizer filter coefficients; calculate for each of the at least one data stream a signal power and an interference power from other stream, if there is any interference from other stream, at least in part based on a set of post equalizer channel coefficients and the set of weighting coefficients; calculate for each of the at least one data stream a noise power at least in part based on the received pilot channels and the set of weighting coefficients; and calculate for each of the at least one data stream a signal to interference and noise ratio based on the corresponding calculated signal power, interference power and noise power.

According to a third aspect of the present invention, a computer program product comprising a computer-readable medium bearing computer program code embodied therein for use with a computer, the computer program code may include code for receiving at least one data stream from at least two transmitter antennas, wherein the at least one data stream is pre-coded by a set of weighting coefficients; code for receiving a pilot channel from each of the at least two transmitter antennas; code for processing the received at least one data stream by an equalizer with a set of equalizer filter coefficients; code for calculating for each of the at least one data stream a signal power and an interference power from other stream, if there is any interference from other stream, at least in part based on a set of post equalizer channel coefficients and the set of weighting coefficients; code for calculating for each of the at least one data stream a noise power at least in part based on the received pilot channels and the set of weighting coefficients; and code for calculating for each of the at least one data stream a signal to interference and noise ratio based on the corresponding calculated signal power, interference power and noise power.

According to a fourth aspect of the present invention, an apparatus may include a means for receiving at least one data stream from at least two transmitter antennas, wherein the at least one data stream is pre-coded by a set of weighting coefficients; a means for receiving a pilot channel from each of the at least two transmitter antennas; a means for processing the received at least one data stream by an equalizer with a set of equalizer filter coefficients; a means for calculating for each of the at least one data stream a signal power and an interference power from other stream, if there is any interference from other stream, at least in part based on a set of post equalizer channel coefficients and the set of weighting coefficients; a means for calculating for each of the at least one data stream a noise power at least in part based on the received pilot channels and the set of weighting coefficients; and a means for calculating for each of the at least one data stream a signal to interference and noise ratio based on the corresponding calculated signal power, interference power and noise power.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
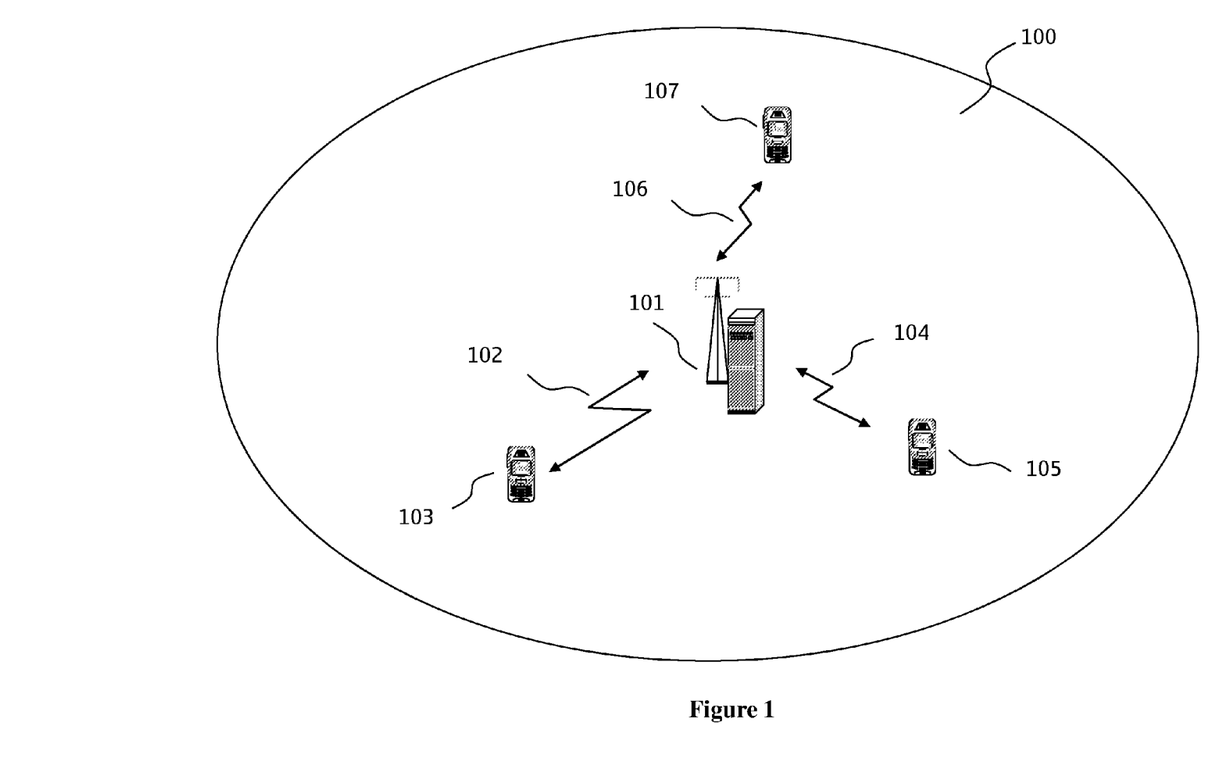
FIG. 1 illustrates an example wireless system in accordance with an example embodiment of the invention.

FIG. 1 illustrates an example wireless system 100 in accordance with an example embodiment of the invention. The example wireless system 100 comprises a Node B 101 and a plurality of user equipments (UEs) 103, 105 and 107. Although just one Node B 101 and three UEs are shown in FIG. 1, the example wireless system 100 may comprise more Node Bs and more or less UEs. In an example embodiment, the Node B 101, possibly together with other Node Bs and one or more radio network controllers, comprises the UMTS (universal mobile telecommunications system) terrestrial radio access network (UTRAN). Further, the Node B 101 communicates with the UEs 103, 105 and 107 via bidirectional communication channels or links 102, 104 and 106, respectively. While some of the UEs, for example, the UEs 105 and 107, may communicate with the Node B 101 in the mode of conventional high speed packet access (HSPA), at least one UE, for example, the UE 103, may communicate with the Node B 101 by using the technology of multiple input multiple output (MIMO) transmission, for example, the double-transmitter antenna array (D-TxAA).

Figure 2:
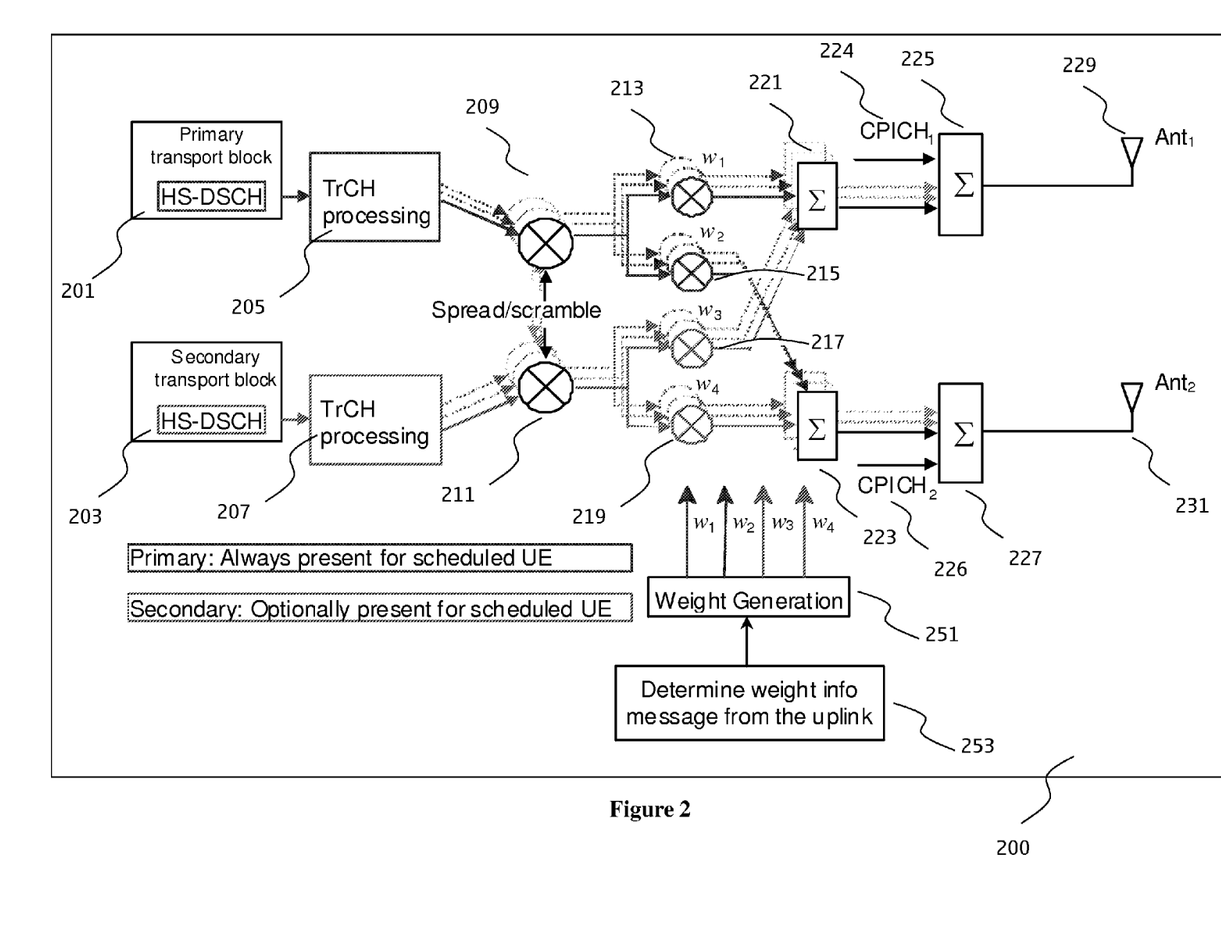
FIG. 2 shows a schematic view of a transmitter operating in accordance with an example embodiment of the invention.

FIG. 2 shows a schematic view of a transmitter 200 operating in accordance with an example embodiment of the invention. The transmitter 200 can be implemented in a Node B, such as Node B 101 of FIG. 1. In an example embodiment, the transmitter 200 is configured to divide the transmission of data information (or data channel) into two blocks: a primary data transport block of the high speed downlink shared channel (HS-DSCH) 201 and a secondary transport block of HS-DSCH 203. In an embodiment it may be possible to use the transmitter 200 for both conventional high speed downlink packet access (HSDPA) and MIMO HSDPA implementations. The primary transport block 201 may be present in both conventional and MIMO implementations. The secondary transport block 203 may be used in MIMO implementations. The size of the secondary transport block generally may not exceed the size of the primary transport block.

The primary transport block data 201 is passed to the primary transport channel (TrCH) processor 205. The primary transport channel processor 205 performs transport channel processing as known in the art. For example according to 3GPP standard 25.212, incorporated by references herein, the transport channel processor 205 may receive data with a maximum rate of a transport block every transmission time interval. The transmission time interval may be about 2 ms which is mapped to a radio sub-frame of 3 slots.

Furthermore in an example embodiment the transport channel processor 205 may carry out the following coding tasks:

adding a cyclic redundancy check (CRC) to each transport block;
performing a bit scrambling;
performing a code block segmentation;
performing a channel coding;
performing a hybrid automatic repeat request (HARM) functionality;
segmenting the physical channel;
interleaving the data for HS-DSCH;
re-arranging the symbol constellation for 16 position Quadrature Amplitude Modulation (16QAM) and 64 position Quadrature Amplitude Modulation (64QAM); and
mapping to the physical channels.

In an example embodiment, a channelization code is applied on the output of each TrCH processor. In an example embodiment, for each of the primary and secondary transport block, more than one channelization codes may be applied in parallel after the TrCH processing. This is denoted by the dotted elements in FIG. 2.

In an example embodiment, the primary transport channel processor 205 then passes the processed data to the primary stream data channel spreader/scrambler 209.

In an example embodiment, the primary stream data channel spreader/scrambler 209 receives the spreading/scrambling code as well as the output of the primary transport channel processor 205 and outputs scrambled data to the primary stream data channel first antenna multiplier 213 and the primary stream data channel second antenna multiplier 215.

In an example embodiment, the primary stream data channel first antenna multiplier 213 multiplies the scrambled data by the first beamforming weighting coefficient $w_1$ and outputs the product to the first antenna data adder 221.

In an example embodiment, the primary stream data channel second antenna multiplier 215 multiplies the scrambled data by the second beamforming weighting coefficient $w_2$ and passes this information to the second antenna data adder 223.

In an example embodiment, in a similar manner the secondary transport block 203 data is passed to the secondary transport channel (TrCH) processor 207. The secondary transport channel processor 207 performs transport channel processing as known in the art and described above with respect to the primary transport channel processor 205. The secondary transport channel processor 207 then passes the processed data to the secondary stream data channel spreader/scrambler 211.

In an example embodiment, the secondary stream data channel spreader/scrambler 211 receives the spreading/scrambling code as well as the output of the secondary transport channel processor 207 and outputs scrambled data to the secondary stream data channel first antenna multiplier 217 and the secondary stream data channel second antenna multiplier 219.

In an example embodiment, the secondary stream data channel first antenna multiplier 217 multiplies the scrambled data by the third beamforming weighting coefficient $w_3$ and outputs the product to the first antenna data adder 221.

In an example embodiment, the secondary stream data channel second antenna multiplier 219 multiplies the scrambled data by the fourth beamforming weighting coefficient $w_4$ and passes this information to the second antenna data adder 223.

In an example embodiment, the first antenna data adder 221 adds the weighted outputs from the primary and secondary streams of the transport/data channel and passes these to the first antenna adder 225.

In an example embodiment, the first antenna adder 225 receives both the output of the first antenna data adder 221 and the Common Pilot Channel (CPICH) for the first antenna $CPICH_1$ 224 and outputs the combination towards the first antenna 229.

In an example embodiment, similarly the second antenna data adder 223 adds the weighted outputs from the primary and secondary streams of the transport/data channel and passes these to the second antenna adder 227.

In an example embodiment, the second antenna adder 227 receives both the output of the second antenna data adder 223 and the second antenna pilot signal $CPICH_2$ 226 and outputs the combined stream towards the second antenna 231.

It would be appreciated that there may be further processing carried out on the combined data and pilot signals output to either of the antennas. For example the combined signals may be converted into transmission symbols, or modulated by a higher frequency modulation carrier signal. However these are not described in detail to simplify the understanding of the example embodiment.

The weighting generator 251 generates the beamforming weighting coefficients $w_1$, $w_2$, $w_3$ and $w_4$, dependent on the weight determining function 253. The weight determining function 253 determines the beamforming weighting coefficients by receiving the precoding control information (PCI) from the uplink.

In an example embodiment, the first antenna pilot signal $CPICH_1$ 224 may be the primary CPICH (P-CPICH) and the second antenna pilot signal $CPICH_2$ 226 may be the secondary CPICH (S-CPICH). In another example embodiment, the first antenna pilot signal $CPICH_1$ 224 may be the primary CPICH with one pilot pattern while the second antenna pilot signal $CPICH_2$ 226 may be the primary CPICH with another pilot pattern. Either P-CPICH or S-PICH may be used as a phase reference for signal to interference and noise ratio (SINR) estimation. When S-CPICH is used as a phase reference and the power of S-CPICH is offset to the power of P-CPICH, the estimation of the interference from one steam to another stream may not be correct if the conventional SINR estimation method is applied, because P-CPICH and S-CPICH use different channelization codes.

It should be noted that in an example embodiment, the secondary transport block 203 may not be present and there is only the primary transport block 201 that is transmitted by the two transmitter antennas 229 and 231. Accordingly, in this single stream transmission scenario, only coefficients $w_1$ and, $w_2$ are used.

In an example embodiment, the SINR of each of at least one data streams is calculated based on two sources: the stream power and power of interference from other stream in case of more than one stream transmission is calculated with the help of post equalizer channel coefficients, and the noise power corresponding to each stream is calculated with the help of pilot symbols. When S-CPICH is used, both P-CPICH and S-CPICH can be used for noise power calculation.

Figure 3:
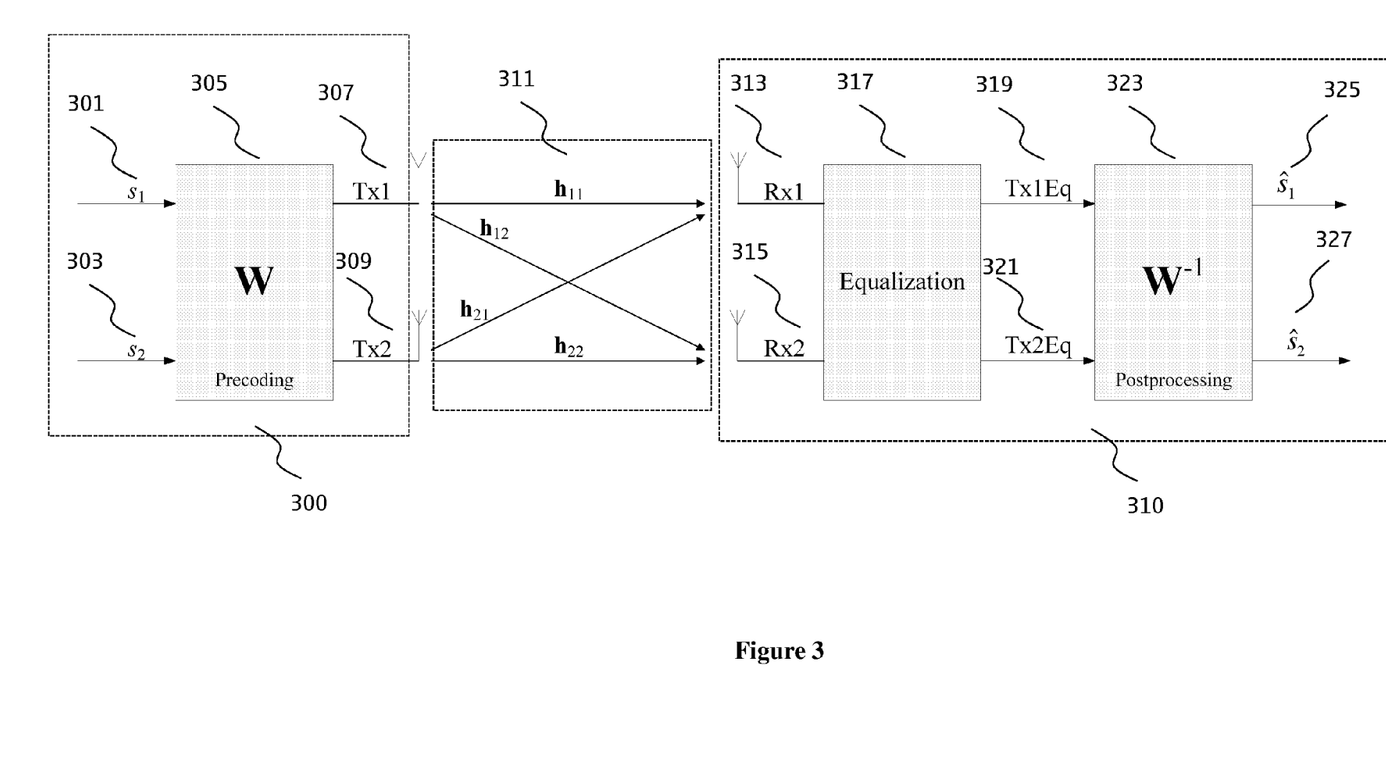
FIG. 3 shows a schematic view of a transmitter and a receiver operating in accordance with an example embodiment of the invention.

FIG. 3 shows a schematic view of a transmitter 300 and a receiver 310 operating in accordance with an example embodiment of the invention. At a transmitter 300, for example, transmitter 200 of FIG. 2, in case of dual stream transmission, two data streams $s_1$ 301 and $s_2$ 303, e.g., the outputs of the data channel spreaders/scramblers 209 and 211 of FIG. 2, are pre-coded by weighting coefficients matrix W 305. In an example embodiment, the weighting coefficients matrix W includes weighting coefficients, such as weighting coefficients $w_1$, $w_2$, $w_3$ and $w_4$ of FIG. 2. In case of single stream transmission, weighting coefficients, such as $w_1$ and $w_2$ of FIG. 2 are used. Each pre-coded data stream from 305 is transmitted by transmitter antenna Tx1 307 and Tx2 309, respectively.

At the receiver 310, the signal transmitted by the transmitter 300 is received by two receiver antennas Rx1 313 and Rx2 315. The equalization block 317 processes the two received data streams from Rx1 313 and Rx2 315 and generates the estimates of the transmitted signal Tx1Eq 319 and Tx2Eq 321. At the postprocessing block 323, the estimates of the original data streams $s_1$ and $s_2$, denoted by $\hat{s}_1$ 325 and $\hat{s}_2$ 327, are obtained by taking into account the weighting coefficients matrix W.

In the example embodiment described by FIG. 3, the multipath wireless channels 311 between the two transmitter antennas, 307 and 309, and the two receiver antennas, 313 and 315, are represented by $h_{ij}$, i, j=1,2. Specifically, $h_{ij}$ is the channel vector corresponding to the wireless channel between the transmitter antenna Txi and the receiver antenna Rxj.

Figure 4:
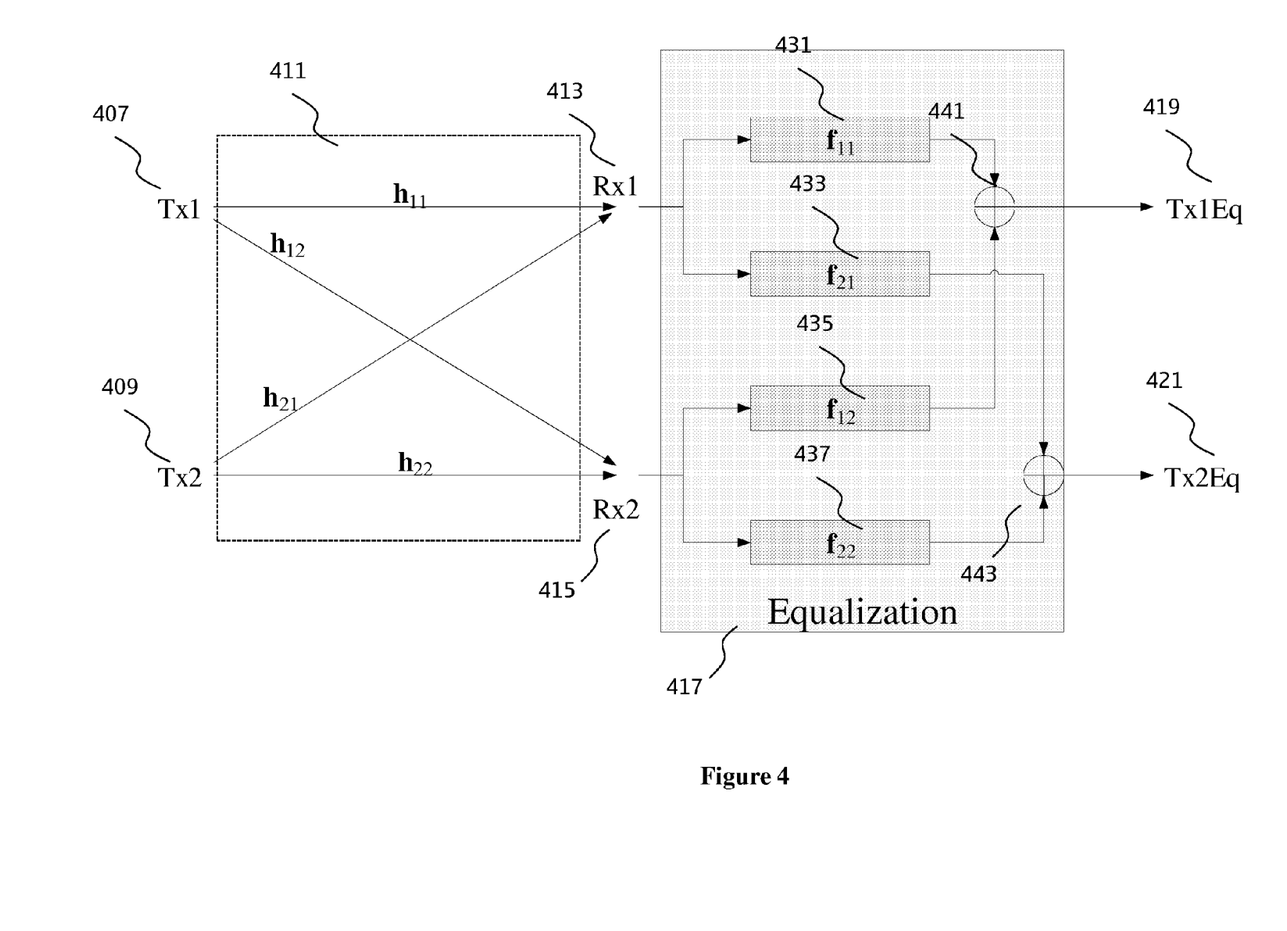
FIG. 4 shows an equalization block in accordance with an example embodiment of the invention.

FIG. 4 shows an equalization block in accordance with an example embodiment of the invention. In an example embodiment, transmitted signals from two transmitter antennas Tx1 407 and Tx2 409 pass through multi-path wireless channels 411. A channel vector $h_{ij}$, i, j=1,2 represents the wireless channel between the transmitter antenna Txi and the receiver antenna Rxj, i, j=1,2.

In an example embodiment, inside the equalization block 417, $f_{ij}$, i, j=1,2, denotes the coefficients of the equalizer filter corresponding to the transmitter antenna Txi and the receiver antenna Rxj. At the equalization block 417, the received signal at receiver antenna Rx1 413 is convolved with $f_{11}$ and the output is sent to the first equalization adder 441.

In an example embodiment, the received signal at receiver antenna Rx1 413 is also convolved with $f_{21}$ and the output is sent to the second equalization adder 443.

In an example embodiment, the received signal at receiver antenna Rx2 415 is convolved with $f_{22}$ and the output is sent to the second equalization adder 443.

In an example embodiment, the received signal at receiver antenna Rx2 415 is also convolved with $f_{12}$ and the output is sent to the first equalization adder 441.

In an example embodiment, the first equalization adder 441 generates an estimate of the transmitted signal of Tx1 407, Tx1Eq 419; and the second equalization adder 443 generates an estimate of the transmitted signal of Tx2 409, Tx2Eq 421.

In accordance with example embodiments of the invention, assume that the equalizer, 317 of FIG. 3 or 417 of FIG. 4, equalizes the multipath channel and the resulting channel after equalization process can be represented as 1-tap channel and thus the effective channel after equalization can be represented as 2×2 matrix $$\tilde{H} = \begin{bmatrix} \tilde{h}_{11} & \tilde{h}_{21} \\ \tilde{h}_{12} & \tilde{h}_{22} \end{bmatrix},$$

where $\tilde{h}_{11}$ is the channel gain coefficient corresponding to the signal transmitted from antenna Tx1, $\tilde{h}_{22}$ is the channel gain coefficient corresponding to the signal transmitted from antenna Tx2, $\tilde{h}_{12}$ is the channel gain coefficient corresponding to the interfering signal from antenna Tx1 to antenna Tx2, and $\tilde{h}_{21}$ is the channel gain coefficient corresponding to the interfering signal from antenna Tx2 to antenna Tx1. These channel gain coefficients can be calculated with the help of channel estimates and equalizer filter coefficients. The estimates of the data symbols corresponding to the primary stream and the secondary stream at the equalizer output $\hat{s}_1$ and $\hat{s}_2$ can be represented as follows:

$$\begin{bmatrix} \hat{s}_1 \\ \hat{s}_2 \end{bmatrix} = W^{-1} \tilde{H} W \begin{bmatrix} s_1 \\ s_2 \end{bmatrix},$$

where $s_1$ and $s_2$ are the original primary stream and secondary stream transmitted symbols, for example, output signals of data channel spreader/scramblers 209 and 211 in FIG. 2, $$W = \begin{bmatrix} w_1 & w_3 \\ w_2 & w_4 \end{bmatrix}$$

is weighting coefficients matrix, such as weighting coefficients matrix illustrated in FIGS. 2 and 3, $$W^{-1} = \begin{bmatrix} w_1^* & w_2^* \\ w_3^* & w_4^* \end{bmatrix},$$

where the superscript * denotes the conjugate operation. In an example embodiment, the signal to interference and noise ratio for the primary stream and the secondary stream can be calculated with the help of matrices $$T = W^{-1} \tilde{H} W = \begin{bmatrix} t_{11} & t_{21} \\ t_{12} & t_{22} \end{bmatrix}$$

and $$T_\gamma = W^{-1} \tilde{H}_\gamma W = \begin{bmatrix} t_{\gamma 11} & t_{\gamma 21} \\ t_{\gamma 12} & t_{\gamma 22} \end{bmatrix},$$

where $$\tilde{H}_\gamma = \begin{bmatrix} \tilde{h}_{11} \cdot \sqrt{\gamma_1} & \tilde{h}_{21} \cdot \sqrt{\gamma_2} \\ \tilde{h}_{12} \cdot \sqrt{\gamma_1} & \tilde{h}_{22} \cdot \sqrt{\gamma_2} \end{bmatrix},$$

$\gamma_1$ corresponds to the power offset of P-CPICH to high speed physical downlink shared channel (HS-PDSCH) and $\gamma_2$ corresponds to power offset of S-CPICH to HS-PDSCH. The power of the primary stream and the secondary stream is defined by the value of $|t_{\gamma 11}|^2$ and $|t_{\gamma 22}|^2$ correspondingly. The interference power from the primary stream to the secondary stream is defined by $|t_{\gamma 12}|^2$ and from the secondary stream to the primary stream by $|t_{\gamma 21}|^2$. In an example embodiment, the noise power of the primary stream can be calculated as variance of $t_{\gamma 11}$ and the noise power of the secondary stream can be calculated as variance of $t_{\gamma 22}$. But this method may be not reliable enough due to the fact that the post equalizer channel coefficients are calculated based on impulse response measurements (IRMs), which are filtered to eliminate the noise. In another example embodiment, the pilot symbols can be used for calculation of the noise power. However, it may be not appropriate to use pilots directly for calculation of the noise power corresponding to data streams due to the fact that the pilot symbols are not weighted with matrix W as data symbols are. In an example embodiment, the pilot symbols may be used to calculate the analogy of the post equalizer channel coefficients $$H' = \begin{bmatrix} h'_{11} & h'_{21} \\ h'_{12} & h'_{22} \end{bmatrix}$$

as will be illustrated below. Then, in the same way as matrix T, the matrix $$T' = W^{-1} H' W = \begin{bmatrix} t'_{11} & t'_{21} \\ t'_{12} & t'_{22} \end{bmatrix}$$

can be calculated.

Based on the matrix T', the estimates of noise power for the primary stream and the secondary stream as variances of elements $t'_{11}$ and $t'_{22}$ can be calculated. Thus, the signal power and interference power for the primary stream and the secondary stream may be calculated with the help of post equalizer channel coefficients $$\tilde{H} = \begin{bmatrix} \tilde{h}_{11} & \tilde{h}_{21} \\ \tilde{h}_{12} & \tilde{h}_{22} \end{bmatrix},$$

and the noise power estimates may be calculated with the help of coefficients $$H' = \begin{bmatrix} h'_{11} & h'_{21} \\ h'_{12} & h'_{22} \end{bmatrix}$$

based on pilot symbols. Then SINR value for the primary stream (i=1) and the secondary stream (i=2) can be calculated as follows $$SINR(i) = \frac{|t_{\gamma ii}|^2}{\text{Var}(t'_{ii}) + |t_{\gamma ji}|^2}, (i, j = 1, 2; i \neq j),$$

where Var(x) stands for variance of x. Note that in order to obtain the values of SINR(i), $\tilde{H}$, hence $\tilde{H}_\gamma$, and H' are calculated, as elaborated in the following.

In accordance with example embodiments of the invention, the received signal at the receiver antennas Rx1, 313 of FIG. 3 or 413 of FIG. 4, and Rx2, 315 of FIGS. 3 and 415 of FIG. 4, can be represented as follows:

$$R = \begin{bmatrix} R_1 \\ R_2 \end{bmatrix} \quad (1)$$

$$= HW's + n$$

$$= \begin{bmatrix} H_{11} & H_{21} \\ H_{12} & H_{22} \end{bmatrix} W' \begin{bmatrix} s_1 \\ s_2 \end{bmatrix} + \begin{bmatrix} n_1 \\ n_2 \end{bmatrix}$$

where $$R = \begin{bmatrix} R_1 \\ R_2 \end{bmatrix} \in C^{N_r N_s F \times 1}$$

is the complex sample-level received symbol vector, $R_j = [r_j(N_s F-1), r_j(N_s F-2), \ldots, r_j(0)]^T \in C^{N_s F \times 1}$ is the received symbol vector for receive antenna j, j=1,2, the superscript T denotes the transpose operation, $N_s$ is the number of samples per chip, F is the equalizer filter length in chips, $N_t$ is the number of transmitter antennas, and $N_r$ is the number of receiver antennas. In the example embodiments illustrated in FIGS. 3 and 4, $N_t$=2 and $N_r$=2. Corresponding notation holds for the noise term $n \in C^{N_r N_s F \times 1}$. The chip-level transmitted symbol vector is $$s = \begin{bmatrix} s_1 \\ s_2 \end{bmatrix} \in C^{N_t(F+L-1) \times 1},$$

where $s_i = [s_i(F-1), s_i(F-2), \ldots, s_i(0), \ldots, s_i(-L+1)]^T \in C^{(F+L-1) \times 1}$ is the transmitted symbol vector for transmit antenna i, i=1,2, and L is the channel length in chips. The MIMO channel matrix $$H = \begin{bmatrix} H_{11} & H_{21} \\ H_{12} & H_{22} \end{bmatrix} \in C^{N_r N_s F \times N_t (F+L-1)}$$

is defined by four submatrices when $N_s$=2

(2)

$$H_{ij} = \begin{bmatrix} h_{ij}[1] & h_{ij}[3] & \ldots & h_{ij}[LN_s-1] & 0 & \ldots & 0 \\ h_{ij}[0] & h_{ij}[2] & \ldots & h_{ij}[LN_s-2] & 0 & \ldots & 0 \\ 0 & h_{ij}[1] & h_{ij}[3] & \ldots & h_{ij}[LN_s-1] & 0 & \vdots \\ 0 & h_{ij}[0] & h_{ij}[2] & \ldots & h_{ij}[LN_s-2] & 0 & \vdots \\ \vdots & \ddots & \ddots & \ddots & \ddots & \ddots & 0 \\ 0 & \ldots & 0 & h_{ij}[1] & h_{ij}[3] & \ldots & h_{ij}[LN_s-1] \\ 0 & \ldots & 0 & h_{ij}[0] & h_{ij}[2] & \ldots & h_{ij}[LN_s-2] \end{bmatrix} \quad (2)$$

where $H_{ij} \in C^{N_s F \times (F+L-1)}$ is the channel matrix between transmit antenna i and receive antenna j. Note that the channel matrix $H_{ij}$ includes F identical submatrices that are constructed from the channel vector $h_{ij}$. For different number of samples per chip $N_s$, $H_{ij}$ can be constructed in a similar way without loss any generality. In Equation (1), $$W' = \begin{bmatrix} w_1 I_{(F+L-1)} & w_3 I_{(F+L-1)} \\ w_2 I_{(F+L-1)} & w_4 I_{(F+L-1)} \end{bmatrix} \in C^{N_t(F+L-1) \times N_t(F+L-1)}$$

is the precoding matrix, where $I_{(F+L-1)}$ is (F+L-1)×(F+L-1) identity matrix, and in accordance with example embodiments of the invention the weights are (3)

$$w_3 = w_1 = 1/\sqrt{2} \quad (3)$$

$$w_4 = -w_2$$

$$w_2 \in \left\{ \frac{1+j}{2}, \frac{1-j}{2}, \frac{-1+j}{2}, \frac{-1-j}{2} \right\}$$

where $j = \sqrt{-1}$.

In accordance with example embodiments of the invention, the 1-tap channel coefficients $\tilde{h}_{11}$, $\tilde{h}_{12}$, $\tilde{h}_{21}$, and $\tilde{h}_{22}$, resulted from the equalizer, can be calculated with the help of channel estimates and equalizer filter coefficients. In an example embodiment in accordance with the equalization process shown in FIG. 4, the channel gain coefficients are calculated for each receiver antenna. As can be seen from FIG. 4, two sets of channel gain coefficients are provided:

$$\tilde{h}_{11}(Rx1) = \hat{h}_{11} \otimes f_{11}$$

$$\tilde{h}_{21}(Rx1) = \hat{h}_{21} \otimes f_{11}$$

$$\tilde{h}_{12}(Rx1) = \hat{h}_{11} \otimes f_{21}$$

$$\tilde{h}_{22}(Rx1) = \hat{h}_{21} \otimes f_{21}$$

$$\tilde{h}_{11}(Rx2) = \hat{h}_{12} \otimes f_{12}$$

$$\tilde{h}_{21}(Rx2) = \hat{h}_{22} \otimes f_{12}$$

$$\tilde{h}_{12}(Rx2) = \hat{h}_{12} \otimes f_{22}$$

$$\tilde{h}_{22}(Rx2) = \hat{h}_{22} \otimes f_{22}, \quad (4)$$

where $\hat{h}_{ij}$ is the estimate of channel from the transmitter antenna i to the receiver antenna j, $f_{ij}$ represents the coefficients of the equalizer filter corresponding to the transmitter antenna i to the receiver antenna j, and $\otimes$ denotes the convolution. Combining the channel gain coefficients corresponding to different receiver antennas, one can obtain $$\tilde{h}_{11} = \tilde{h}_{11}(Rx1) + \tilde{h}_{11}(Rx2)$$

$$\tilde{h}_{21} = \tilde{h}_{21}(Rx1) + \tilde{h}_{21}(Rx2)$$

$$\tilde{h}_{12} = \tilde{h}_{12}(Rx1) + \tilde{h}_{12}(Rx2)$$

$$\tilde{h}_{22} = \tilde{h}_{22}(Rx1) + \tilde{h}_{22}(Rx2). \quad (5)$$

The matrix $$\tilde{H} = \begin{bmatrix} \tilde{h}_{11} & \tilde{h}_{21} \\ \tilde{h}_{12} & \tilde{h}_{22} \end{bmatrix}$$

contains the noise components and can be represented as a sum of matrix of truly channel gain coefficients $\check{H}$ and the noise N as $\tilde{H} = \check{H} + N$. Taking in account that noise represented by matrix N has zero mean, based on Equation (5), the signal power $|t_{\gamma i i}|^2$ (i=1, 2) and interference power $|t_{\gamma i j}|^2$, (i, j=1,2; i≠j) can be calculated according to $$T_\gamma = W^{-1} \tilde{H}_\gamma W = \begin{bmatrix} t_{\gamma 11} & t_{\gamma 21} \\ t_{\gamma 12} & t_{\gamma 22} \end{bmatrix},$$

where $$\tilde{H}_\gamma = \begin{bmatrix} \tilde{h}_{11} \cdot \sqrt{\gamma_1} & \tilde{h}_{21} \cdot \sqrt{\gamma_2} \\ \tilde{h}_{12} \cdot \sqrt{\gamma_1} & \tilde{h}_{22} \cdot \sqrt{\gamma_2} \end{bmatrix}, \gamma_1$$

corresponds to the power offset of P-CPICH to HS-PDSCH and $\gamma_2$ corresponds to power offset of S-CPICH to HS-PDSCH.

In accordance with an example embodiment, to calculate the noise power, the pilot symbols can be used to calculate the analogy of the post equalizer channel coefficients $$H' = \begin{bmatrix} h'_{11} & h'_{21} \\ h'_{12} & h'_{22} \end{bmatrix}.$$

IRMs are normally assumed to be scaled in accordance with the power offset between P-CPICH and S-CPICH. Therefore, the coefficients $\tilde{h}_{21}$ and $\tilde{h}_{22}$ are also scaled in accordance with $\sqrt{\gamma}$, where $\gamma$ is the power offset between P-CPICH and S-CPICH in linear scale. To scale the noise power that is calculated based on pilot symbols in accordance with the level of signal and interference power estimates that are calculated with the help of post equalizer channel coefficients, the signal power estimates are also calculated with the help of pilot symbols as shown in FIG. 5.

Figure 5:
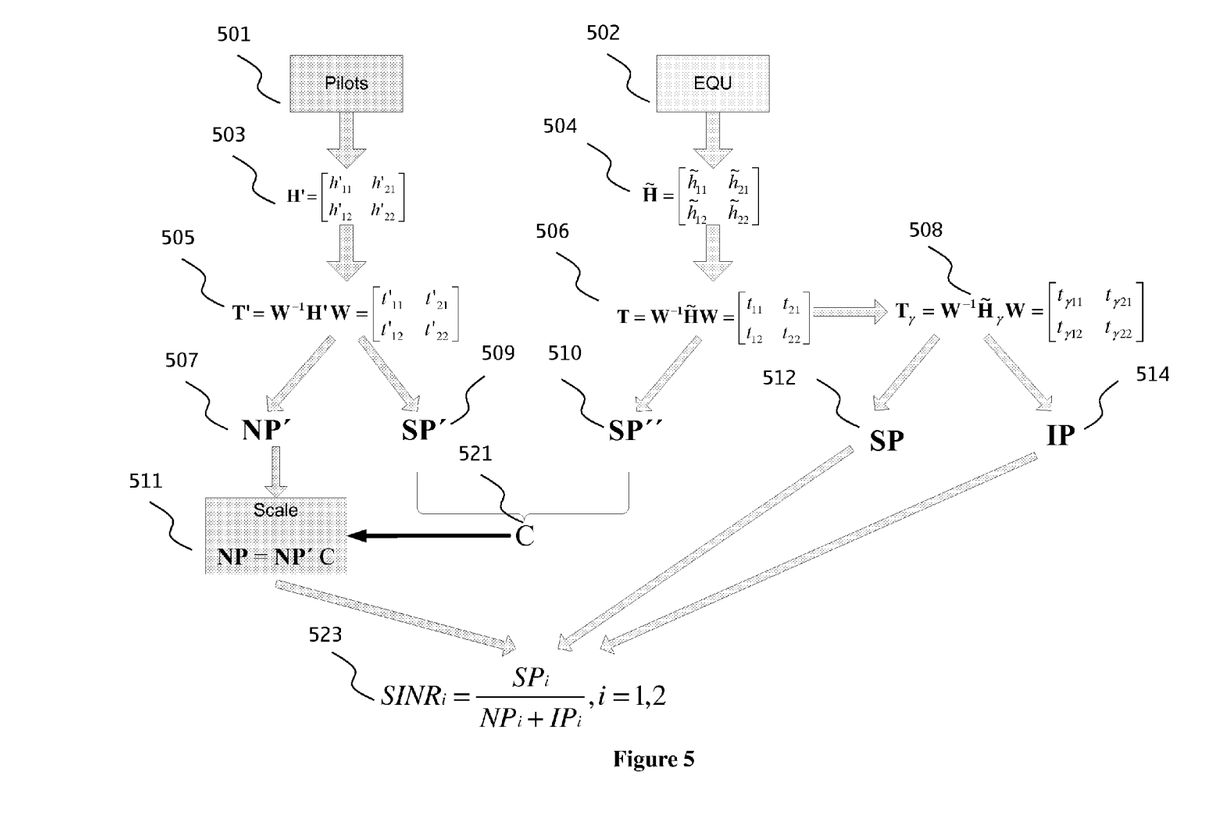
FIG. 5 illustrates scaling of a noise power in accordance with an example embodiment of the invention.

FIG. 5 illustrates the scaling of the noise power in accordance with an example embodiment of the invention. Based at least in part on pilot symbols 501 used on the transmitter antennas, the analogy of the post equalizer channel coefficients H' 503 can be calculated and the matrix $T'=W^{-1}H'W$ 505 is formed accordingly. The unscaled noise power of the primary stream and the secondary stream $NP'=[NP_1',NP_2']^T$ 507 can be obtained as the variances of $t_{11}'$ and $t_{22}'$. The signal power of the primary stream and the secondary stream $SP'=[SP_1',SP_2']^T$ 509 can be derived as the power of elements $t_{11}'$ and $t_{22}'$.

As mentioned earlier, the 1-tap effective channel after equalization $\tilde{H}$ 504 may be estimated with the help of channel estimates and equalizer filter coefficients 502 and the matrix $$T = W^{-1}\tilde{H}W = \begin{bmatrix} t_{11} & t_{21} \\ t_{12} & t_{22} \end{bmatrix}$$

506, as well as $T_\gamma = W^{-1}\tilde{H}_\gamma W$ 508, where $$\tilde{H}_\gamma = \begin{bmatrix} \tilde{h}_{11} \cdot \sqrt{\gamma_1} & \tilde{h}_{21} \cdot \sqrt{\gamma_2} \\ \tilde{h}_{12} \cdot \sqrt{\gamma_1} & \tilde{h}_{22} \cdot \sqrt{\gamma_2} \end{bmatrix},$$

can be formed. For the purpose of calculating the scaling parameter of noise power, the signal power $SP''=[SP''_1, SP''_2]^T$ 510 of the primary stream and the secondary stream can be derived accordingly based on T. On the other hand, the actual signal power $SP=[SP_1,SP_2]^T$ 512 and interference power $IP=[IP_1,IP_2]^T$ 514 may be calculated based on $T_\gamma$.

By comparing SP' and SP'', the scaling factor C 521 is obtained and the noise power of the primary stream and the secondary stream $NP=[NP_1,NP_2]^T$ 511 is calculated by applying C to NP'. Note that the scaling factors for the primary stream and the secondary stream may be different. In that case, $C_1$ for the primary stream and $C_2$ for the secondary stream can be applied to $NP'_1$ and $NP'_2$, respectively.

Finally, the SINRs 523 for the primary stream and the secondary stream are obtained by using the corresponding signal power 512, interference power 514 and noise power 511.

In accordance with example embodiments of the invention, the coefficients $$H' = \begin{bmatrix} h'_{11} & h'_{21} \\ h'_{12} & h'_{22} \end{bmatrix}$$

are calculated differently based at least in part on which mode of pilot symbols transmission is used. There are two possible modes: 1) Node B, such as Node B 101 in FIG. 1, transmits P-CPICH from antenna Tx1 and S-CPICH from antenna Tx2. Both pilots P-CPICH and S-CPICH are transmitted with the same pilot pattern 1 (see 3GPP, "TS 25.211 *Physical channels and mapping of transport channels onto physical channels (FDD) (Release 8)*", v8.6.0 (2009-12), 2009 subclause 5.3.3.1, which is incorporated herein by reference in its entirety); 2) Node B transmits P-CPICH with pilot pattern 1 from antenna Tx1 and P-CPICH with pilot pattern 2 from antenna Tx2.

In case of using P-CPICH for antenna Tx1 and S-CPICH for antenna Tx2 the elements of H' may be calculated as follows:

$$h'_{11} = \frac{(pT \times 1R \times 1 + pT \times 1R \times 2)}{(1+j)}$$

$$h'_{12} = \frac{(pT \times 2R \times 1 + pT \times 2R \times 2)}{(1+j)}$$

$$h'_{21} = \frac{(sT \times 1R \times 1 + sT \times 1R \times 2)}{(1+j)}$$

$$h'_{22} = \frac{(sT \times 2R \times 1 + sT \times 2R \times 2)}{(1+j)},$$

where pTxkRxl denotes P-CPICH filtered or convolved with equalizer filter $f_{kl}$, k, l=1,2, sTxkRxl denotes S-CPICH filtered or convolved with equalizer filter $f_{kl}$, and $j=\sqrt{-1}$.

In case P-CPICH with pilot pattern 1 is transmitted via antenna Tx1 and P-CPICH with pilot pattern 2 via antenna Tx2, the output of the equalizer filters depicted in FIG. 4 at the time moment k can be written as:

$$f_{11}{}^k = pp_1{}^k \cdot h'_{11}(Rx1) + pp_2{}^k \cdot h'_{21}(Rx1) + n_1{}^k$$

$$f_{21}{}^k = pp_1{}^k \cdot h'_{12}(Rx1) + pp_2{}^k \cdot h'_{22}(Rx1) + n_1{}^k$$

$$f_{12}{}^k = pp_1{}^k \cdot h'_{11}(Rx2) + pp_2{}^k \cdot h'_{21}(Rx2) + n_2{}^k$$

$$f_{22}{}^k = pp_1{}^k \cdot h'_{12}(Rx2) + pp_2{}^k \cdot h'_{22}(Rx2) + n_2{}^k, \quad (6)$$

where $pp_1{}^k$ is the pilot pattern 1 and $pp_1{}^k = 1+j$ for any k; $pp_2{}^k$ is the pilot pattern 2 at time moment k; $n_i{}^k$ denotes the noise sample corresponding to receive antenna Rxi at time moment k; $h'_{lm}$ (Rx1) denotes the post equalizer channel coefficient $h'_{lm}$ corresponding to receive antenna Rx1 and $h'_{lm}$ (Rx2) denotes the post equalizer channel coefficient $h'_{lm}$ corresponding to receive antenna Rx2. Obviously, $h'_{lm} = h'_{lm}(Rx1) + h'_{lm}(Rx2)$, l,m=1,2.

At any time moment pilot pattern 2 may take one of two possible values 1+j or −1−j. Taking in account the pilot pattern 2 structure (see 3GPP TS 25.211 *Physical channels and mapping of transport channels onto physical channels (FDD) (Release 8)*", v8.6.0 (2009-12), 2009 Subclause 5.3.3.1), there could be two possible alternatives: $pp_2{}^k = pp_1{}^k = 1+j$ and $pp_2{}^{k+1} = -pp_1{}^{k+1} = -1-j$ or $pp_2{}^k = -pp_1{}^k = -1-j$ and $pp_2{}^{k+1} = pp_1{}^{k+1} = 1+j$. Assuming that $pp_2{}^k = pp_1{}^k = 1+j$ and $pp_2^{k+1} = -pp_1^{k+1} = -1-j$, the output of equalizer filters for pilot symbols in Equation (6) can be combined as follows:

$$f_{11}^k + f_{11}^{k+1} = 2pp_1^k \cdot h'_{11}(Rx1) + 2n_1^k$$

$$f_{11}^k - f_{11}^{k-1} = 2pp_1^k \cdot h'_{21}(Rx1) + 2n_1^k$$

$$f_{12}^k + f_{12}^{k+1} = 2pp_1^k \cdot h'_{11}(Rx2) + 2n_2^k$$

$$f_{12}^k - f_{12}^{k+1} = 2pp_1^k \cdot h'_{21}(Rx2) + 2n_2^k$$

$$f_{21}^k + f_{21}^{k+1} = 2pp_1^k \cdot h'_{12}(Rx1) + 2n_1^k$$

$$f_{21}^k - f_{21}^{k+1} = 2pp_1^k \cdot h'_{22}(Rx1) + 2n_1^k$$

$$f_{22}^k + f_{22}^{k+1} = 2pp_1^k \cdot h'_{12}(Rx2) + 2n_2^k$$

$$f_{22}^k - f_{22}^{k+1} = 2pp_1^k \cdot h'_{22}(Rx2) + 2n_2^k. \quad (7)$$

Correspondingly the Equations (7) can be written for the case when $pp_2^k = -pp_1^k = -1-j$ and $pp_2^{k+1} = pp_1^{k+1} = 1+j$ as follows:

$$f_{11}^k + f_{11}^{k+1} = 2pp_1^k \cdot h'_{21}(Rx1) + 2n_1^k$$

$$f_{11}^k - f_{11}^{k-1} = 2pp_1^k \cdot h'_{11}(Rx1) + 2n_1^k$$

$$f_{12}^k + f_{12}^{k+1} = 2pp_1^k \cdot h'_{21}(Rx2) + 2n_2^k$$

$$f_{12}^k - f_{12}^{k+1} = 2pp_1^k \cdot h'_{11}(Rx2) + 2n_2^k$$

$$f_{21}^k + f_{21}^{k+1} = 2pp_1^k \cdot h'_{22}(Rx1) + 2n_1^k$$

$$f_{21}^k - f_{21}^{k+1} = 2pp_1^k \cdot h'_{12}(Rx1) + 2n_1^k$$

$$f_{22}^k + f_{22}^{k+1} = 2pp_1^k \cdot h'_{22}(Rx2) + 2n_2^k$$

$$f_{22}^k - f_{22}^{k+1} = 2pp_1^k \cdot h'_{12}(Rx2) + 2n_2^k.$$

Then the estimates of coefficients H' may be obtained as if $$pp_2^k = pp_1^k = 1+j \text{ and } pp_2^{k+1} = -pp_1^{k+1} = -1-j$$

$$h'_{11} = \frac{f_{11}^k + f_{11}^{k+1} + f_{12}^k + f_{12}^{k+1}}{2pp_1^k} = \frac{f_{11}^k + f_{11}^{k+1} + f_{12}^k + f_{12}^{k+1}}{2(1+j)}$$

$$h'_{21} = \frac{f_{11}^k - f_{11}^{k+1} + f_{12}^k - f_{12}^{k+1}}{2(1+j)}$$

$$h'_{12} = \frac{f_{21}^k + f_{21}^{k+1} + f_{22}^k + f_{22}^{k+1}}{2(1+j)}$$

$$h'_{22} = \frac{f_{21}^k - f_{21}^{k+1} + f_{22}^k - f_{22}^{k+1}}{2(1+j)}$$

if $pp_2^k = -pp_1^k = -1-j$ and $p_2^{k+1} = p_1^{k+1} = 1+j$ $$h'_{21} = \frac{f_{11}^k + f_{11}^{k+1} + f_{12}^k + f_{12}^{k+1}}{2(1+j)}$$

$$h'_{11} = \frac{f_{11}^k - f_{11}^{k+1} + f_{12}^k - f_{12}^{k+1}}{2(1+j)}$$

$$h'_{22} = \frac{f_{21}^k + f_{21}^{k+1} + f_{22}^k + f_{22}^{k+1}}{2(1+j)}$$

$$h'_{12} = \frac{f_{21}^k - f_{21}^{k+1} + f_{22}^k - f_{22}^{k+1}}{2(1+j)}$$

When coefficients H' are calculated with the help of P-CPICH and S-CPICH or P-CPICH symbols only, the signal power for the primary stream and the secondary stream can be calculated as illustrated in FIG. 5. The coefficients H' are averaged over the transmission time interval (TTI). In an example embodiment, there may be 30 samples of each coefficient $h_{ij}'$ per TTI. The matrix T' is calculated based on the averaged H'. The power of element $t_{11}'$ provides the signal power of the primary stream and the power of element $t_{22}'$ provides the signal power of the secondary stream as shown in FIG. 5. The noise power is calculated in slightly different way. Since the noise is assumed to be generated at the input of receive antennas it does not face the filtering or weighting with matrix W. The noise is filtered with equalizer filters and weighted with matrix $W^{-1}$. The estimates of noise samples at the output of equalizer filters can be obtained by subtracting the average value of coefficient $h_{ij}'$ from each of 30 samples corresponding to that coefficient over the TTI duration as $N = H_k' - H', k=1, \ldots, 30$, where H' denotes the h-coefficients averaged over the TTI and $H_k'$ denotes the current value of h-coefficients corresponding to the kth pilot symbol. Then the weighted noise samples can be calculated as $$N_k^w = \begin{bmatrix} n_{11}^w(k) & n_{21}^w(k) \\ n_{12}^w(k) & n_{22}^w(k) \end{bmatrix} = W^{-1} N_k,$$

$k=1, \ldots, 30$. The noise power corresponding to the primary stream is calculated as the average power of element $n_{11}^w(k)$ over 30 samples, the noise power corresponding to the secondary stream is calculated as the average power of element $n_{22}^w(k)$.

In an example embodiment, the data channel and the pilot channel may use different spreading factor (SF), e.g., SF=16 for the data channel and SF=256 for the pilot channel. Thus, due to the spreading gain the signal to noise ratio (SNR) in pilot channel is higher than the SNR in data channel, and the noise power calculated in pilot channel is scaled accordingly. In another word, the noise power calculated with the help of pilot symbols is be scaled in a way to fit the power level obtained in calculation of signal and interference power with the help of post equalizer channel coefficients. To do this the signal powers calculated with the help of pilot symbols and with the help of post equalizer channel coefficients are compared and the corresponding gain $C_i$ for each stream is calculated as illustrated in FIG. 5. The noise power then can be scaled with the corresponding gain $C_i$. Thus, the equation for calculation SINR value for stream i can be written as follows:

$$SINR(i) = \frac{|p_{ii}|^2}{C_i \cdot \frac{1}{30} \sum_{k=1}^{30} |n_{ii}^w(k)|^2 + |p_{ji}|^2}, \quad i, j = 1, 2; i \neq j.$$

Figure 6:
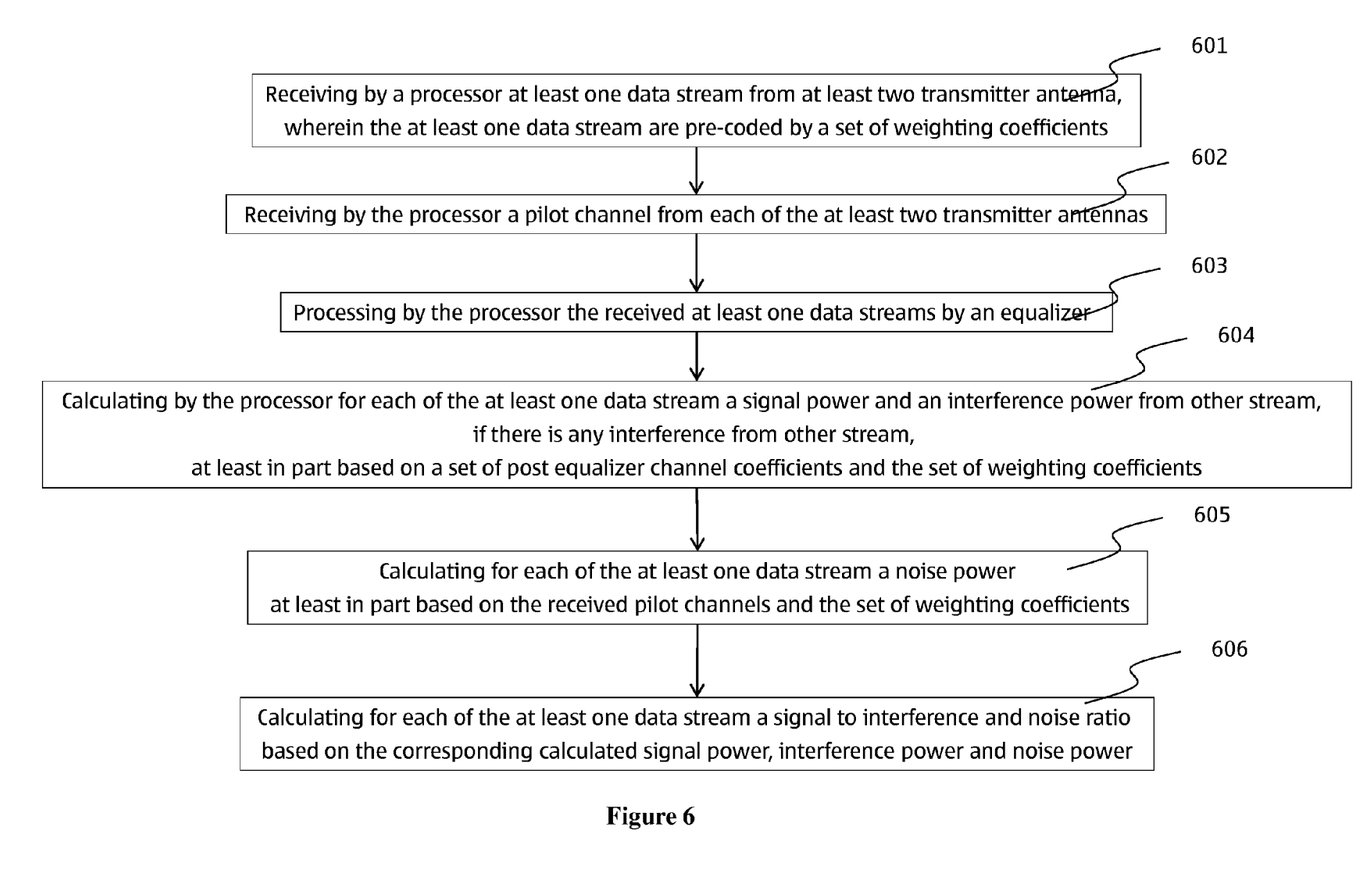
FIG. 6 illustrates an overview of signal to interference and noise ratio (SINR) calculation according to an example embodiment of the invention.

FIG. 6 illustrates an overview of SINR calculation according to an example embodiment of the invention. At 601, at least one data stream from at least two transmitter antennas is received. The at least one data stream are pre-coded by a set of weighting coefficients, for example, W of FIG. 2. At 602, a pilot channel from each of the at least two transmitter antennas is also received. In one embodiment, the pilot channel is multiplexed with the transmitted data. At 603, the received at least one data stream are processed by an equalizer with a set of equalizer filter coefficients, for example, $f_{kl}$, k,l=1,2 of FIG. 4. At 604, for each of the at least one data stream, a signal power and an interference power from other streams are calculated at least in part based on a set of post equalizer channel coefficients and the set of weighting coefficients.

In an example embodiment, the set of post equalizer channel coefficients is computed by the convolution of the set of equalizer filter coefficients with the estimates of channel coefficients. In an example embodiment, the set of post equalizer channel coefficients incorporates a power offset between different pilot channels. At 605, for each of the at least one data stream, a noise power is calculated at least in part based on the received pilot channels and the set of weighting coefficients. In an example embodiment, an analogy of the set of post equalizer channel coefficients is generated based on the received pilot channels and the set of equalizer filter coefficients, and the noise power is calculated based on the generated analogy of the set of post equalizer channel coefficients.

In an example embodiment, for each of the at least one data stream, a second signal power is calculated at least in part based on the received pilot channels and the set of weighting coefficients and is compared with the signal power calculated at least in part based on the set of post equalizer channel coefficients and the set of weighting coefficients, in order to obtain a scaling parameter. The scaling parameter is used to scale the calculated noise power. At 606, the SINR for each of the at least one data stream is calculated based on the corresponding signal power, interference power and noise power.

Figure 7:
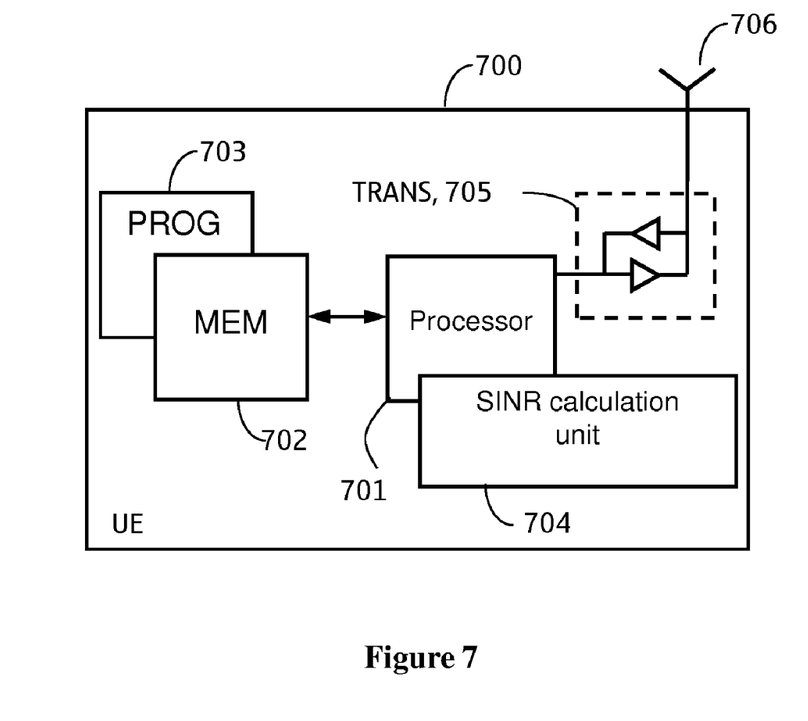
FIG. 7 illustrates a simplified block diagram of an apparatus in accordance with an example embodiment of the invention.

Reference is made to FIG. 7 for illustrating a simplified block diagram of an apparatus 700 in accordance with an example embodiment of the invention. In an example embodiment, the apparatus may be a mobile communication device which may be referred to as the UE 103. The apparatus 700 includes at least one processor 701 and at least one memory (MEM) 702 coupled to the at least one processor 701 that stores a program of computer instructions (PROG) 703. The apparatus 700 may further include a suitable transceiver (TRANS) 705 (having a transmitter (TX) and a receiver (RX)) coupled to the processor 701. The TRANS 705 is for bidirectional wireless communications with other communication devices that are not shown in FIG. 7. The apparatus 700 may also include one or more antenna coupled to the transceiver 705 for transmitting and/or receiving signal with other communication devices.

As shown in FIG. 7, the apparatus 700 may further include a SINR calculation unit 704. The SINR calculation unit 704, together with the processor 701 and the PROG 703, is configured to perform the SINR calculation of data stream in a similar way as illustrated by FIG. 6.

The PROG 703 is assumed to include program instructions that, when executed by the associated processor, enable the electronic apparatus to operate in accordance with the example embodiments of this disclosure, as discussed herein.

In general, the various example embodiments of the apparatus 700 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by the processor 701 of the apparatus 700, or by hardware, or by a combination of software and hardware.

The MEM 702 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor 701 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be allowing the SINR of at least one data stream in a MIMO transmission to be computed with reasonable complexity. This allows the device to take into account the pilot channels transmitted on multiple transmitter antennas to calculate the SINR in an accurate way.

Embodiments of the present invention may be implemented in software, hardware, application logic or a combination of software, hardware and application logic. The software, application logic and/or hardware may reside on an apparatus such as a user equipment, a Node B or other mobile communication devices. If desired, part of the software, application logic and/or hardware may reside on a user equipment 700, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

For example, while the example embodiments have been described above in the context of the HSDPA system for downlink transmission, it should be appreciated that the example embodiments of this invention are not limited for use with only this one particular type of wireless communication system, and that they may be used to advantage in other wireless communication systems and in uplink transmission. Although two streams and two transmitter/receiver antennas are assumed in FIGS. 2, 3 and 4 for illustration purpose, the example embodiments of this invention are also suitable for use with more than two streams and more than two transmitter/receiver antennas.

Further, the various names used for the described parameters are not intended to be limiting in any respect, as these parameters may be identified by any suitable names. Further, the various names assigned to different channels (e.g., P-CPICH, etc.) are not intended to be limiting in any respect, as these various channels may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

What is claimed is:

1. A method, comprising: by a processor,
receiving at least one data stream from at least two transmitter antennas, wherein the at least one data stream is pre-coded by a set of weighting coefficients;
receiving a pilot channel from each of the at least two transmitter antennas;
processing the received at least one data stream by an equalizer with a set of equalizer filter coefficients;
calculating for each of the at least one data stream a signal power and an interference power from other stream, if there is any interference from other steam, at least in part based on a set of post equalizer channel coefficients and the set of weighting coefficients;
calculating for each of the at least one data stream a noise power at least in part based at least in part on the received pilot channels and the set of weighting coefficients;
calculating for each of the at least one data stream a second signal power at least in part based on the received pilot channels and the set of weighting coefficients;
generating for each of the at least one data stream a scaling parameter by comparing the signal power and the second signal power;
scaling the calculated noise power of each of the at least one data stream with the corresponding scaling parameter; and
calculating for each of the at least one data stream a signal to interference and noise ratio based at least in part on the corresponding calculated signal power, interference power and scaled noise power.

2. The method of claim 1, wherein the pilot channels of different transmitter antennas have different channelization codes or have same channelization codes but use different pilot patterns.

3. The method of claim 1, wherein calculating for each of the at least one data stream the signal power and the interference power, if there is any interference from other stream, further comprises estimating a set of channel coefficients and generating the set of post equalizer channel coefficients based on the convolution of the set of estimated channel coefficients and the set of equalizer filter coefficients.

4. The method of claim 3, wherein the set of post equalizer channel coefficients is generated by taking into account a power offset between different pilot channels.

5. The method of claim 1, wherein calculating for each of the at least one data stream the noise power further comprises:
generating an analogy of the set of post equalizer channel coefficients based on the received pilot channels and the set of equalizer filter coefficients.

6. An apparatus, comprising:
at least one processor;
and at least one memory including computer program code,
wherein the at least one memory and the computer program code are configured to, with the at least one processor, cause the apparatus at least to perform:
receive at least one data stream from at least two transmitter antennas, wherein the at least one data stream is pre-coded by a set of weighting coefficients;
receive a pilot channel from each of the at least two transmitter antennas;
process the received at least one data stream by an equalizer with a set of equalizer filter coefficients;
calculate for each of the at least one data stream a signal power and an interference power from other streams, if there is any interference from other stream, at least in part based on a set of post equalizer channel coefficients and the set of weighting coefficients;
calculate for each of the at least one data stream a noise power at least in part based on the received pilot channels and the set of weighting coefficients;
calculate for each of the at least one data stream a second signal power at least in part based on the received pilot channels and the set of weighting coefficients;
generate for each of the at least one data stream a scaling parameter by comparing the signal power and the second signal power;
scale the calculated noise power of each of the at least one data stream with the corresponding scaling parameter; and
calculate for each of the at least one data stream a signal to interference and noise ratio based on the corresponding calculated signal power, interference power and scaled noise power.

7. The apparatus of claim 6, wherein the pilot channels of different transmitter antennas have different channelization codes or have same channelization codes but use different pilot patterns.

8. The apparatus of claim 6, wherein calculate for each of the at least one data stream the signal power and the interference power, if there is any interference from other stream, further comprises estimate a set of channel coefficients and generate the set of post equalizer channel coefficients based on the convolution of the set of estimated channel coefficients and the set of equalizer filter coefficients.

9. The apparatus of claim 8, wherein the set of post equalizer channel coefficients is generated by taking into account a power offset between different pilot channels.

10. The apparatus of claim 6, wherein calculate for each of the at least one data stream the noise power further comprises:
generate an analogy of the set of post equalizer channel coefficients based on the received pilot channels and the set of equalizer filter coefficients.

11. A computer program product comprising a non-transitory computer-readable medium bearing computer program code embodied therein for use with a computer, the computer program code comprising:
code for receiving at least one data stream from at least two transmitter antennas, wherein the at least one data stream is pre-coded by a set of weighting coefficients;
code for receiving a pilot channel from each of the at least two transmitter antennas;
code for processing the received at least one data stream by an equalizer with a set of equalizer filter coefficients;
code for calculating for each of the at least one data stream a signal power and an interference power from other stream, if there is any interference from other stream, at least in part based on a set of post equalizer channel coefficients and the set of weighting coefficients;
code for calculating for each of the at least one data stream a noise power at least in part based on the received pilot channels and the set of weighting coefficients;
code for calculating for each of the at least one data stream a second signal power at least in part based on the received pilot channels and the set of weighting coefficients;
code for generating for each of the at least one data stream a scaling parameter by comparing the signal power and the second signal power;

code for scaling the calculated noise power of each of the at least one data stream with the corresponding scaling parameter; and code for calculating for each of the at least one data stream a signal to interference and noise ratio based on the corresponding calculated signal power, interference power and scaled noise power.

12. The computer program product of claim 11, wherein the pilot channels of different transmitter antennas have different channelization codes or have same channelization codes but use different pilot patterns.

13. The computer program product of claim 11, wherein the computer program code for calculating for each of the at least one data stream the signal power and the interference power, if there is any interference from other stream, further comprises code for estimating a set of channel coefficients and generating the set of post equalizer channel coefficients based on the convolution of the set of estimated channel coefficients and the set of equalizer filter coefficients.

14. The computer program product of claim 13, wherein the set of post equalizer channel coefficients is generated by taking into account a power offset between different pilot channels.

15. The computer program product of claim 11, wherein the computer program code for calculating for each of the at least one data stream the noise power further comprises code for generating an analogy of the set of post equalizer channel coefficients based on the received pilot channels and the set of equalizer filter coefficients.

* * * * *